US011880786B2

(12) United States Patent
Tokuoka

(10) Patent No.: US 11,880,786 B2
(45) Date of Patent: Jan. 23, 2024

(54) VEHICLE MANAGEMENT SYSTEM, VEHICLE MANAGEMENT COMPUTER, AND VEHICLE MANAGEMENT METHOD

(71) Applicant: Nissan Motor Co., Ltd., Yokohama (JP)

(72) Inventor: Takamitsu Tokuoka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 477 days.

(21) Appl. No.: 17/253,155

(22) PCT Filed: Jun. 18, 2018

(86) PCT No.: PCT/JP2018/023143
§ 371 (c)(1),
(2) Date: Dec. 17, 2020

(87) PCT Pub. No.: WO2019/244213
PCT Pub. Date: Dec. 26, 2019

(65) Prior Publication Data
US 2021/0326778 A1    Oct. 21, 2021

(51) Int. Cl.
*G06Q 10/02* (2012.01)
*B60L 53/64* (2019.01)
(Continued)

(52) U.S. Cl.
CPC ............. *G06Q 10/02* (2013.01); *B60L 53/64* (2019.02); *G06Q 10/1093* (2013.01);
(Continued)

(58) Field of Classification Search
CPC ............. G06Q 10/02; G06Q 10/1093; G06Q 30/0206; G06Q 50/30; B60L 53/64; B60L 53/68; B60L 58/13
See application file for complete search history.

(56) References Cited

U.S. PATENT DOCUMENTS

2003/0236601 A1* 12/2003 McLeod ................. B60L 58/12
                                                        701/31.4
2004/0164616 A1*  8/2004 Obayashi ................ B60K 6/46
                                                        307/18
(Continued)

FOREIGN PATENT DOCUMENTS

DE    102010054136 A1 *  6/2012 .......... B60L 11/1862
JP     2012-75313 A       4/2012
(Continued)

OTHER PUBLICATIONS

Oxford English Dictionary definition of 'cost effective' <https://www.oed.com/search/dictionary/?scope=Entries&q=cost+effective> (Year: 2023).*
(Continued)

*Primary Examiner* — Jeff Zimmerman
*Assistant Examiner* — Brian A Tallman
(74) *Attorney, Agent, or Firm* — Global IP Counselors, LLP

(57) ABSTRACT

When it is necessary to charge the battery of one vehicle of a plurality of vehicles, a vehicle management computer acquires information relating to a charging facility that supplies electric power to a charge-discharge device, and information relating to the battery of another vehicle, which is different from the first vehicle, and which battery is connected to the first vehicle via the charge-discharge device. Based on the information relating to the charging facility and the information relating to the battery of the other vehicle, the vehicle management computer determines which is least expensive, a first cost associated with charging the battery of the first vehicle using the electric power that is supplied from the charging facility, or a second cost associated with charging the battery of the first vehicle using
(Continued)

the electric power that is discharged from the battery of the other vehicle.

11 Claims, 15 Drawing Sheets

(51) Int. Cl.
*G06Q 10/1093* (2023.01)
*G06Q 30/0201* (2023.01)
*G06Q 50/30* (2012.01)
*B60L 53/68* (2019.01)
*B60L 58/13* (2019.01)

(52) U.S. Cl.
CPC ......... *G06Q 30/0206* (2013.01); *G06Q 50/30* (2013.01); *B60L 53/68* (2019.02); *B60L 58/13* (2019.02)

(56) References Cited

U.S. PATENT DOCUMENTS

| | | | |
|---|---|---|---|
| 2007/0124181 A1* | 5/2007 | Feyder | G06Q 50/14 705/5 |
| 2009/0177595 A1* | 7/2009 | Dunlap | B60L 53/31 320/109 |
| 2009/0210357 A1* | 8/2009 | Pudar | B60L 53/65 705/412 |
| 2010/0138363 A1* | 6/2010 | Batterberry | G06Q 10/04 700/297 |
| 2011/0204720 A1 | 8/2011 | Ruiz et al. | |
| 2011/0270476 A1* | 11/2011 | Doppler | B60L 15/2045 320/109 |
| 2013/0162037 A1* | 6/2013 | Kim | H02J 3/381 307/24 |
| 2014/0149156 A1* | 5/2014 | Schroeder | E04H 6/426 705/5 |
| 2015/0324944 A1* | 11/2015 | Lord | G06Q 50/30 705/7.13 |
| 2016/0159250 A1 | 6/2016 | Meng et al. | |
| 2018/0032920 A1* | 2/2018 | Ito | G06Q 10/02 |
| 2018/0054070 A1* | 2/2018 | Krishnamoorthy | H02J 7/0014 |
| 2019/0168630 A1* | 6/2019 | Mrlik | B60L 53/51 |

FOREIGN PATENT DOCUMENTS

| | | |
|---|---|---|
| JP | 2013-65265 A | 4/2013 |
| JP | 2013-172488 A | 9/2013 |
| JP | 5287409 B2 | 9/2013 |
| WO | 2015/178158 A1 | 11/2015 |

OTHER PUBLICATIONS

Cambridge English Dictionary definition of 'cost-effective' <https://dictionary.cambridge.org/us/dictionary/english/cost-effective?q=cost+effectiveness> (Year: 2023).*

M. Wang et al.; "A Semi-distributed V2V Fast Charging Strategy Based on Price Control"; Globecom 2014—Wireless Networking Symposium; pp. 4550-4555. (Year: 2014).*

"Cost-effective" definition <https://www.merriam-webster.com/dictionary/cost-effective>, Merriam-Webster. (Year: 2023).*

Wang et al. "A Semi-distributed V2V Fast Charging Strategy Based on Price Control", 2014 IEEE Global Communications Conference. IEEE, 2014. (Year: 2014).*

* cited by examiner

TABLE 1

| BATTERY 53B | CHARGE-DISCHARGE DEVICE 40A |
|---|---|
| SOC . 30kWh | LOCATION INFORMATION CHARGING OUTPUT: 60 kW |

TABLE 2

|  | ELECTRICITY CHARGE |
|---|---|
| DAYTIME | ¥27/kWh |
| NIGHTTIME | ¥13/kWh |

FIG. 4

| BATTERY 53B | BATTERY 53C | CHARGE-DISCHARGE DEVICE 40A |
|---|---|---|
| SOC : 30kWh | SOC : 5kWh | LOCATION INFORMATION CHARGING OUTPUT: 60 |

FIG. 6

| | BATTERY 53B | BATTERY 53C | CHARGE-DISCHARGE DEVICE 40A |
|---|---|---|---|
| CASE 1 | SOC : 30kWh | SOC : 5kWh | LOCATION INFORMATION CHARGING OUTPUT: 60 kW |
| CASE 2 | SOC : 5kWh | SOC : 5kWh | LOCATION INFORMATION CHARGING OUTPUT: 60 kW |

FIG. 9

VEHICLE MANAGEMENT SYSTEM, VEHICLE MANAGEMENT COMPUTER, AND VEHICLE MANAGEMENT METHOD

CROSS-REFERENCE TO RELATED APPLICATIONS

This application is a U.S. national stage application of International Application No. PCT/JP2018/023143, filed on Jun. 18, 2018.

TECHNICAL FIELD

The present invention relates to a vehicle management system, a vehicle management computer, and a vehicle management method.

BACKGROUND INFORMATION

Research on the charging of batteries of electric vehicles has intensified in recent years (Japanese Patent No. 5287409—hereinafter referred to as Patent Document 1). In the invention disclosed in Patent Document 1, remaining battery capacity information of an electric vehicle used for car sharing is acquired from a charging station. In the invention disclosed in Patent Document 1, if the remaining battery capacity is low, it is determined whether charging is possible based on the operating status of the charging station, and if charging is possible, it is determined that a reservation can be made.

SUMMARY

However, the invention disclosed in Patent Document 1 assumes a situation in which a battery is charged only by means of a power grid. There is also a method in which the battery of one vehicle is used to charge the battery of another vehicle. The charging cost of using the battery of another vehicle may be less than that of using a power grid.

Given the problem described above, an object of the present invention is to provide a vehicle management system, a vehicle management computer, and a vehicle management method with which a battery can be charged economically.

A vehicle management system according to one aspect of the present invention includes a vehicle management computer that manages a plurality of vehicles and charge-discharge devices. When it is necessary to charge the battery of one of a plurality of vehicles, the vehicle management computer acquires information relating to a charging facility that supplies electric power to a charge-discharge device, and information relating to the battery of another vehicle, which is different from the first vehicle, and which battery is connected to the first vehicle via the charge-discharge device. The vehicle management computer, based on the information relating to the charging facility and the information relating to the battery of the other vehicle, determines which is less expensive: a first cost associated with charging the battery of the first vehicle using electric power supplied from the charging facility or a second cost associated with charging the battery of the first vehicle using electric power that is discharged from the battery of the other vehicle. The vehicle management computer sends a command to the charge-discharge device to charge the battery of the first vehicle by means of the electric power of the less expensive of the first cost and the second cost. The charge-discharge device charges the battery of the first vehicle based on the command received from the vehicle management computer.

By means of the present invention, economical battery charging can be realized.

BRIEF DESCRIPTION OF THE DRAWINGS

Referring now to the attached drawings which form a part of this original disclosure.

FIG. 4 is a diagram describing a comparison of charging fees.

FIG. 6 is a diagram describing a comparison of the charging fees.

FIG. 9 is a diagram describing a comparison of the charging fees.

DETAILED DESCRIPTION OF EMBODIMENTS

Figure 1:
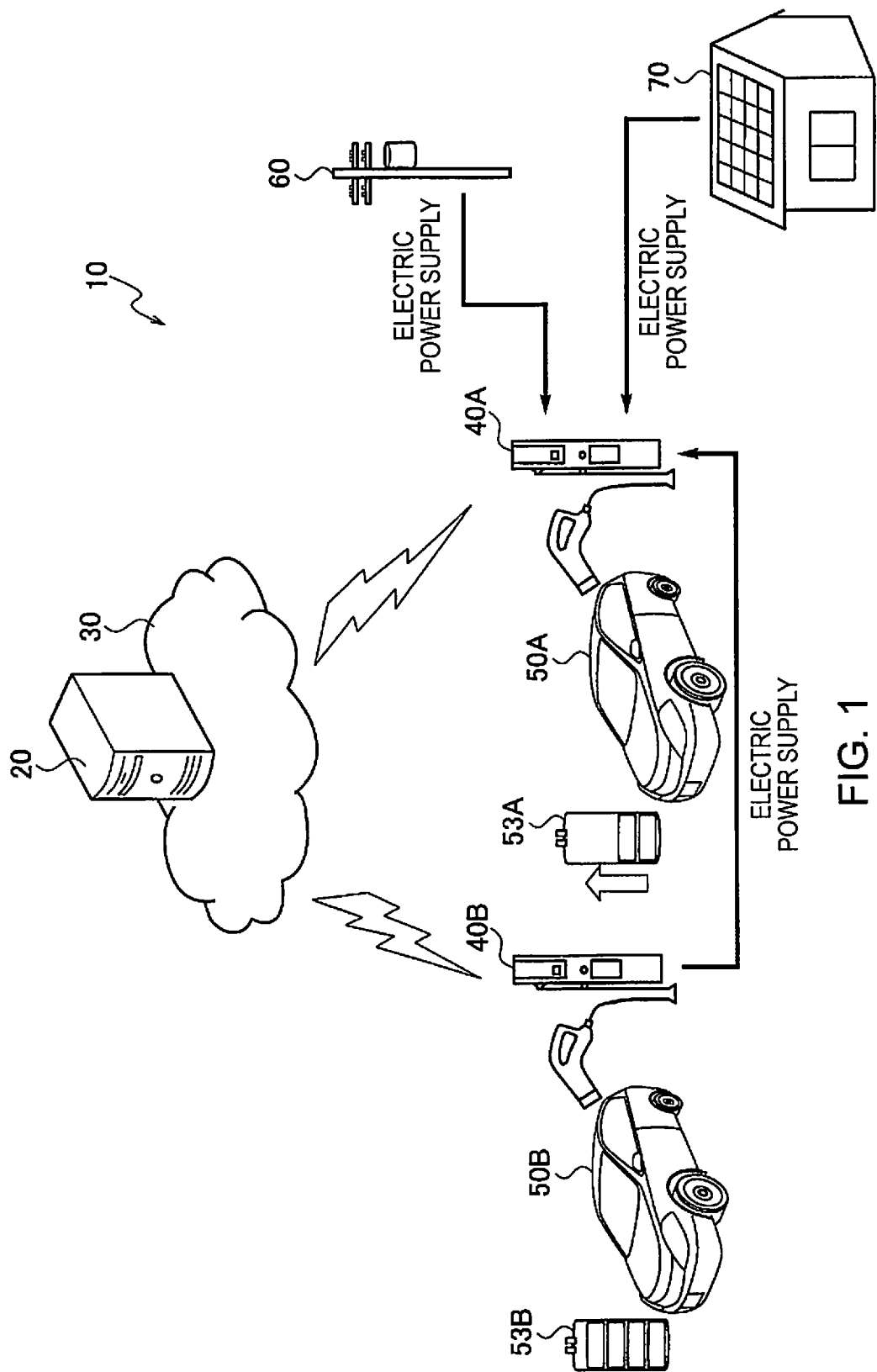
FIG. 1 is a schematic diagram of a vehicle management system according to a first embodiment of the present invention.

Embodiments of the present invention are described below with reference to the drawings. In the descriptions of the drawings, identical parts have been assigned the same reference numerals, and their descriptions have been omitted.

First Embodiment

The configuration of a vehicle management system 10 will be described with reference to FIG. 1. As shown in FIG. 1, the vehicle management system 10 comprises a vehicle management computer 20, a communication network 30, a plurality of charge-discharge devices (40A, 40B), a plurality of vehicles (50A, 50B), a power grid 60, and a photovoltaic device 70. Although there are two charge-discharge devices 40A, 40B in FIG. 1, no limitation is imposed thereby. The vehicle management system 10 may include three or more charge-discharge devices. Similarly, although there are two vehicles 50A, 50B in FIG. 1, no limitation is imposed thereby. The vehicle management system 10 may include three or more vehicles.

The vehicle management computer 20 communicates with the charge-discharge devices 40A, 40B via the communication network 30. The vehicle management computer 20 is a general-purpose computer (terminal device), for example, and comprises a processor including CPU, and memory including ROM (Read-Only Memory) and RAM (Random-Access Memory). The CPU reads a program stored in the ROM, or the like, into the RAM and executes the program. Part (or all) of the vehicle management system 10 including a function of the vehicle management computer 20 described below may be provided by means of an application (Software as a Service (SaaS), or the like) placed on a communication network 30. In addition, the vehicle management computer 20 may be a server.

The communication network 30 may be configured by a wireless and/or wired system, and the communication network 30 may also include the Internet. In the present embodiment, the vehicle management computer 20 and the charge-discharge devices 40A, 40B are connected to the communication network 30 by means of a wireless communication system.

As shown in FIG. 1, the charge-discharge device 40A is connected to the vehicle 50A. The charge-discharge device 40A uses electric power supplied from the power grid 60, the photovoltaic device 70, and the like, to charge a battery 53A mounted in the vehicle 50A. The charge-discharge device 40B is connected to a vehicle 50B. The charge-discharge device 40B uses electric power supplied from the power grid 60, the photovoltaic device 70, and the like, to charge a battery 53B mounted in the vehicle 50B. In the following description, the electric power supplied from the power grid 60 may simply be referred to as grid power. And the electric power supplied from the photovoltaic device 70 may simply be referred to as photovoltaic power. Further, the charge-discharge devices 40A, 40B include the function of discharging the electric power of the batteries 53A, 53B to supply power to electrical equipment in homes. The electrical equipment connected to the charge-discharge device 40A is not limited to the power grid 60 and the photovoltaic device 70. A domestic storage battery may be connected to the charge-discharge device 40A.

In the present embodiment, the charge-discharge device 40A and the charge-discharge device 40B are connected to each other. The vehicle 50A is electrically connected to the vehicle 50B via the charge-discharge device 40A and the charge-discharge device 40B. As shown in FIG. 1, the charge-discharge device 40A has a function for using the electric power of the battery 53B to charge the battery 53A via the charge-discharge device 40B. In other words, the charge-discharge device 40B has a function for supplying the electric power from the battery 53B to the battery 53A via the charge-discharge device 40A. In this manner, the charge-discharge devices 40A, 40B manage the charging and discharging of the batteries 53A, 53B.

The vehicles 50A, 50B are electric vehicles or hybrid vehicles. The battery 53A and the battery 53B are respectively mounted in the vehicles 50A, 50B. If the vehicle 50A is regarded as a first vehicle, the vehicle 50B is the other vehicle, which is different from the vehicle 50A.

Figure 2:
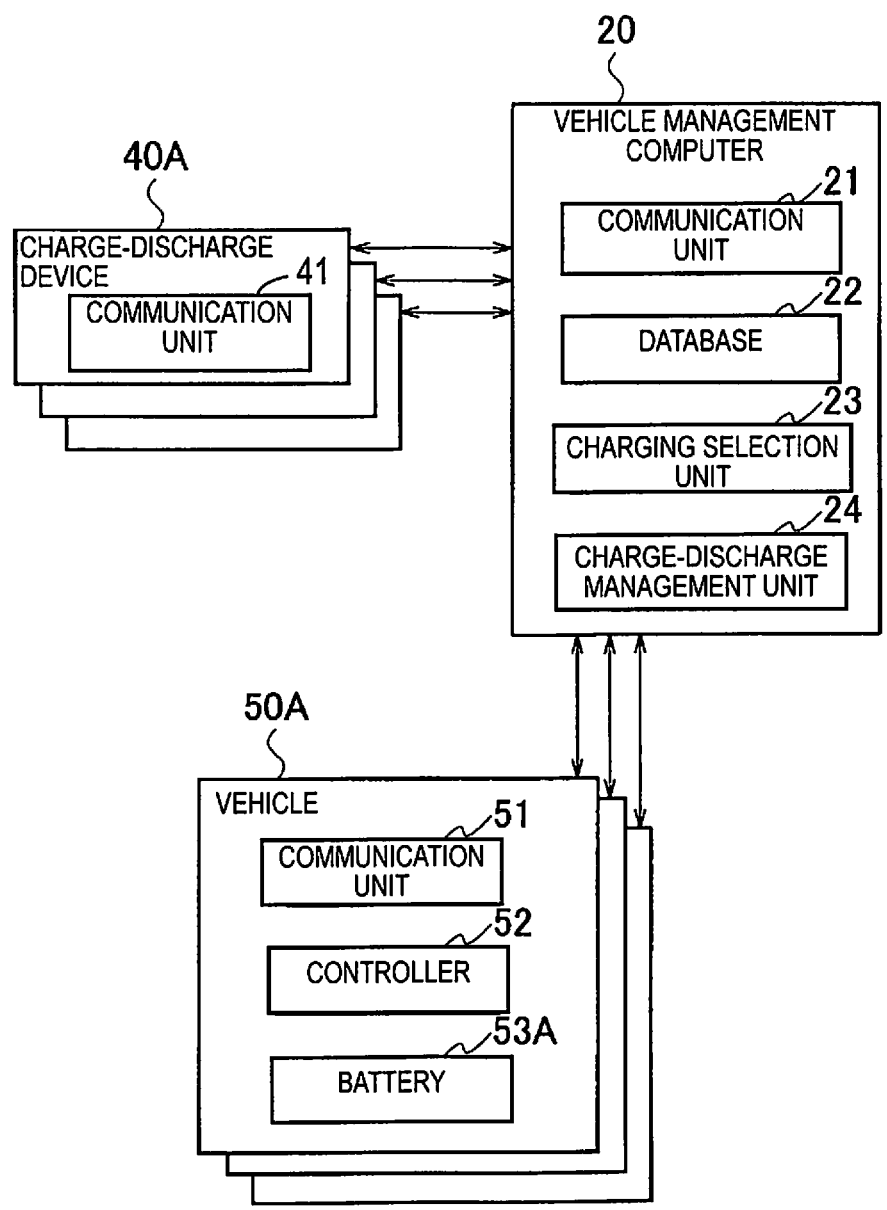
FIG. 2 is a schematic configuration diagram of the vehicle management system according to the first embodiment of the present invention.

The vehicle management computer 20, the charge-discharge device 40A, and the vehicle 50A will be described next with reference to FIG. 2. In FIG. 2, the charge-discharge device 40B and the vehicle 50B are omitted. The configuration and functions of the charge-discharge device 40B are the same as those of the charge-discharge device 40A. The configuration and functions of the vehicle 50B are the same as those of the vehicle 50A.

As shown in FIG. 2, the vehicle management computer 20 comprises a communication unit 21, a database 22, a charging selection unit 23, and a charge-discharge management unit 24. The charge-discharge device 40A comprises a communication unit 41. The vehicle 50A comprises a communication unit 51, a controller 52, and the battery 53A.

The communication unit 21, the communication unit 41, and the communication unit 51 are interfaces that are connected to the communication network 30 to transmit/receive data.

Various types of information are stored in the database 22. For example, the base rate, daytime rate, and nighttime rate of the grid power are stored in the database 22.

When the battery 53A is to be charged, the charging selection unit 23 selects the charging method. When the battery 53A is charged, the charge-discharge management unit 24 (control unit) manages the charge-discharge device 40A, and the like.

The controller 52 sends the remaining capacity (SOC: state of charge) of the battery 53A) to the vehicle management computer 20 via the communication unit 51.

Figure 3:
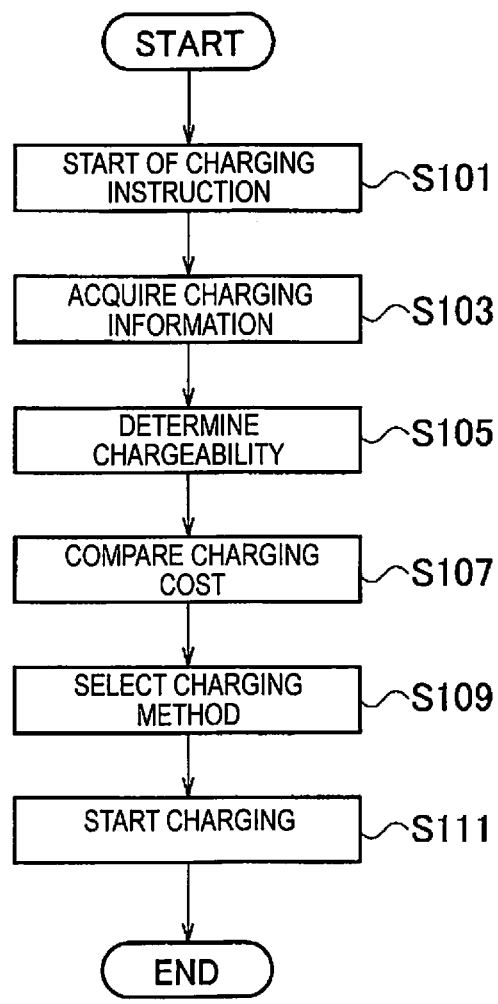
FIG. 3 is a flowchart describing one operation example of the vehicle management system according to the first embodiment of the present invention.

An operation example of the vehicle management system 10 will be described next with reference to the flowchart shown in FIG. 3 and FIG. 4.

In Step S101, the driver of the vehicle 50A issues a start of charging instruction. For example, the driver issues a charging instruction by pressing a charge start switch provided on the charge-discharge device 40A. The charge-discharge device 40A sends the driver's instruction to the vehicle management computer 20. The vehicle management computer 20 determines that it is necessary to charge the battery 53A based on the driver's instruction. The means to initiate charging is not limited in this way. For example, the vehicle management computer 20 may determine that it is necessary to charge the battery 53A when the state of charge of the battery 53A is at or below a prescribed value (for example, 20% or less). In addition, the vehicle management computer 20 may determine that it is necessary to charge the battery 53A when the remaining capacity of the battery 53A is less than the rated capacity. In the flowchart shown in FIG. 3, it is assumed that the driver issues an instruction at 9:00 AM on Apr. 24, 2018, to initiate charging by specifying the travel distance. At this time, the remaining capacity of the battery 53A is 0 kWh. The travel distance specified by the driver may be converted into a charging amount by the vehicle management computer 20. Here, the converted charging amount is 18 kWh. In addition, it is assumed that the driver issues an instruction for the charging to be completed by 12:00 PM on Apr. 24, 2018.

The process proceeds to Step S103, and the vehicle management computer 20 acquires various types of information relating to charging. The vehicle management computer 20 obtains information on what could be used as a power source for charging the battery 53A. For example, the vehicle management computer 20 obtains information that the power grid 60 and the battery 53B of the vehicle 50B can be used as power sources for charging the battery 53A. In addition, as shown in Table 1 of FIG. 4, the vehicle management computer 20 acquires the remaining capacity of the battery 53B and location information of the charge-discharge device 40A. As shown in Table 1 of FIG. 4, the remaining capacity of the battery 53B is 30 kWh. In addition, the vehicle management computer 20 acquires the current time. The vehicle management computer 20 acquires the electricity charges for the current time in the area where the charge-discharge device 40A is installed, based on the current time and the location information of the charge-discharge device 40A. The electricity charges for each region and time are prestored in the database 22. Here, electricity charges means the charges for the power supplied from the power grid 60. As shown in FIG. 4, Table 2, the daytime electricity charge in the area where the charge-discharge device 40A is installed is ¥27/kWh, and the nighttime electricity charge is ¥13/kWh. The charging output shown in Table 1 of FIG. 4 is the output supplied from the power grid 60. In addition, the vehicle management computer 20 acquires the charge history of the battery 53B. The charge history of the battery 53B is information indicating when, where, and how the battery 53B was charged. This type of charge history of the battery 53B is stored in a controller installed in the vehicle 50B, for example. The vehicle management computer 20 can acquire the charge history of the battery 53B in order to calculate the cost of charging the battery 53B. In the flowchart shown in FIG. 3, it is assumed that the battery 53B was charged to the full charging amount by means of nighttime grid power. In addition, the vehicle management computer 20 also acquires the remaining capacity of the battery 53A. As described above, the remaining capacity of the battery 53A is 0 kWh.

The process proceeds to Step S105, and the vehicle management computer 20 determines whether the battery 53A can be charged. Here, a case in which the battery 53A cannot be charged will be described. For example, if the charging amount specified by the driver is 18 kWh but the remaining capacity of the battery 53B of the vehicle 50B is 10 kWh, the vehicle management computer 20 determines that the remaining capacity of the battery 53B is insufficient. The vehicle management computer 20 thus determines that the battery 53A cannot be charged using the electric power of the battery 53B. In this case, the vehicle management computer 20 may carry out charging via the electric power supplied from the power grid 60 for the full 18 kWh. The flowchart of FIG. 3 shows that the remaining capacity of the battery 53B is 30 kWh; thus, the battery 53A can be charged.

The process proceeds to Step S107, and the vehicle management computer 20 calculates the cost associated with charging the battery 53A via the grid power and the cost associated with charging the battery 53A by means of the electric power of the battery 53B. In the following descriptions, the term first cost is simply used in reference to those cases for which the charging cost is associated with charging the battery 53A using grid power. In addition, the term second cost is simply used in reference to those cases for which the charging cost is associated with charging the battery 53A by means of the electric power of the battery 53B. Since the current time is 9:00, the first cost is represented by Equation 1.

Equation 1

$$¥27/kWh \times 18\ kWh = ¥486 \quad (1)$$

On the other hand, as described above, since the battery 53B was charged to the full charging amount at night, the second cost is represented by Equation 2.

Equation 2

$$¥13/kWh \times 18\ kWh = ¥234 \quad (2)$$

The vehicle management computer 20 compares the first cost and the second cost and determines which is less expensive. In this case, since the second cost is less than the first cost, the vehicle management computer 20 determines that charging the battery 53A using the electric power of the battery 53B is more economical.

The process proceeds to Step S109, and the vehicle management computer 20 selects an economical charging method. In the flowchart shown in FIG. 3, the vehicle management computer 20 selects the charging method using the electric power of the battery 53B.

The process proceeds to Step S111, and the vehicle management computer 20 sends the charging method selected in Step S109 to the charge-discharge device 40A. In other words, the vehicle management computer 20 sends a command to the charge-discharge device 40A to charge the battery 53A using the electric power associated with the less expensive of the first cost and the second cost. The charge-discharge device 40A charges the battery 53A based on the command received from the vehicle management computer 20. In the flowchart shown in FIG. 3, the charge-discharge device 40A charges the battery 53A using the electric power of the battery 53B. This means of charging decreases the remaining capacity of the battery 53B. For this reason, the charge-discharge device 40B may wait until night to charge the battery 53B via the nighttime grid power.

As described above, the following actions and effects can be achieved by means of the vehicle management system 10 according to the first embodiment.

The vehicle management system 10 includes the plurality of vehicles 50A, 50B, respectively provided with the batteries 53A, 53B, the charge-discharge devices 40A, 40B that charge the batteries 53A, 53B, and with the vehicle management computer 20 that manages the vehicles 50A, 50B and the charge-discharge devices 40A, 40B. When, of the vehicles 50A, 50B, it becomes necessary to charge the battery 53A of vehicle 50A, the vehicle management computer 20 acquires information relating to a charging facility that can supply electric power to the charge-discharge device 40A, and information relating to the battery 53B of the vehicle 50B, which is different from the vehicle 50A, and which battery is connected to the vehicle 50A via the charge-discharge device 40A. The information relating to a charging facility that supplies electric power to the charge-discharge device 40A is information relating to the power grid 60, the photovoltaic device 70, and the like. Based on the information relating to the charging facility and the information relating to the battery 53B of the vehicle 50B, the vehicle management computer 20 determines which is less expensive, the first cost associated with charging the battery 53A of the vehicle 50A via electric power (grid power) supplied from the charging facility or the second cost associated with charging the battery 53A of the vehicle 50A by means of electric power that is discharged from the battery 53B of the vehicle 50B. The vehicle management computer 20 sends a command to the charge-discharge device 40A to charge the battery 53A of the vehicle 50A using electric power associated with the lesser of the first cost and the second cost. The charge-discharge device 40A charges the battery 53A of the vehicle 50A based on the command received from the vehicle management computer 20.

In this manner, the vehicle management system 10 can charge the battery 53A using inexpensive electric power. It is thus possible to realize economical battery charging. In general, a base rate is set for grid power, and electric power that can be supplied is determined on the basis of the contracted base rate. Thus, when the battery 53A is charged by means of only grid power, there are cases in which charging will not be completed within the time set by the driver (three hours in the flowchart of FIG. 3). One way to solve this problem would be to contract at a higher base rate and increase the amount of electric power that can be supplied. However, this method increases the base rate burden. If the electric power of the battery 53B of the vehicle 50B is used as in the present embodiment, this can also contribute to quick charging, so increasing the base rate becomes unnecessary. In addition, such quick charging is also more convenient for the driver. Equations 1 and 2 described above, emphasized a metered electricity rate, but the present invention is not limited in this way. The vehicle management system 10 may calculate the charging cost in consideration of not only the metered electricity rate, but also the base rate, equipment cost of the charge-discharge devices 40A, 40B, installation costs, etc.

In the first embodiment, it was stated that the battery 53B was charged to the full charging amount by means of nighttime grid power. Charging the battery 53A using the electric power discharged from the battery 53B means carrying out charging with inexpensive electric power. In this manner, the vehicle management system 10 utilizes nighttime grid power, and thus is capable of contributing to the leveling of grid power usage. As a result, for example, one power plant can be stably operated continuously, which could extend the service life of the power plant. Therefore, the vehicle management system 10 may contribute to reducing the overall cost that is required to supply electrical power. The vehicle management system 10 may also contribute to suppressing carbon dioxide emissions.

Figure 5:
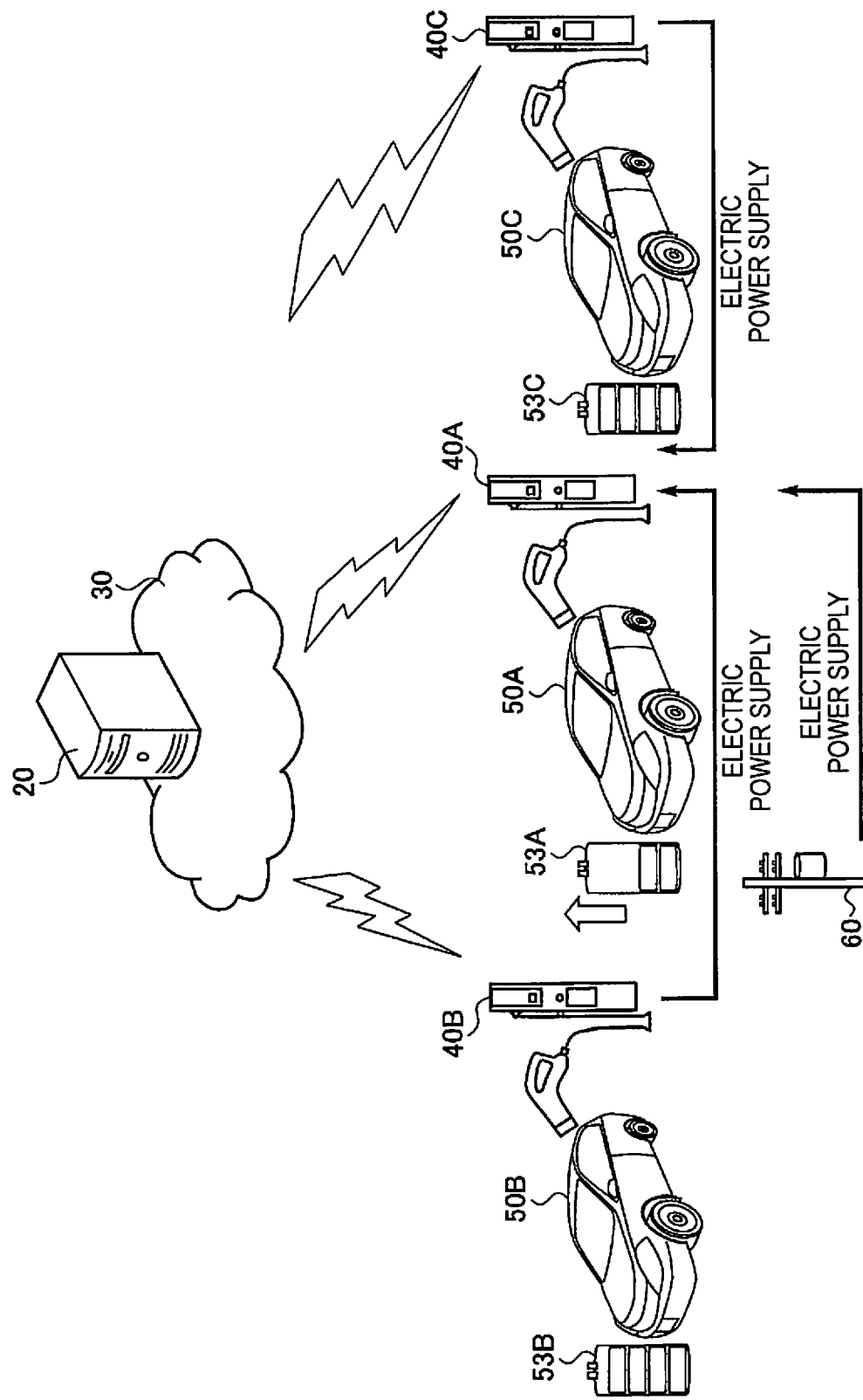
FIG. 5 is another schematic diagram of the vehicle management system according to the first embodiment of the present invention.

As shown in FIG. 5, the vehicle management system 10 may further comprise a charge-discharge device 40C. Here, as shown in Table 3 of FIG. 6, it is assumed that the remaining capacity of the battery 53B is 30 kWh and the remaining capacity of the battery 53C is 5 kWh. Since the charging amount specified by the driver is 18 kWh (refer to FIG. 3) the vehicle management computer 20 determines that the remaining capacity of the battery 53C is insufficient. In this case, the vehicle management computer 20 may compare the charging cost associated with using the grid power and the charging cost associated with using the electric power of the battery 53B to determine which charging means is more economical. In addition, when the remaining capacity of the battery 53C is 18 kWh or more, the vehicle management computer 20 may compare the charging cost associated with charging the battery 53A using grid power, the charging cost associated with charging the battery 53A using the electric power of the battery 53B, and the charging cost associated with charging the battery 53A using the electric power of the battery 53C. With more candidates for comparison, the possibility of finding a less expensive charging means increases.

Second Embodiment

Figure 7:
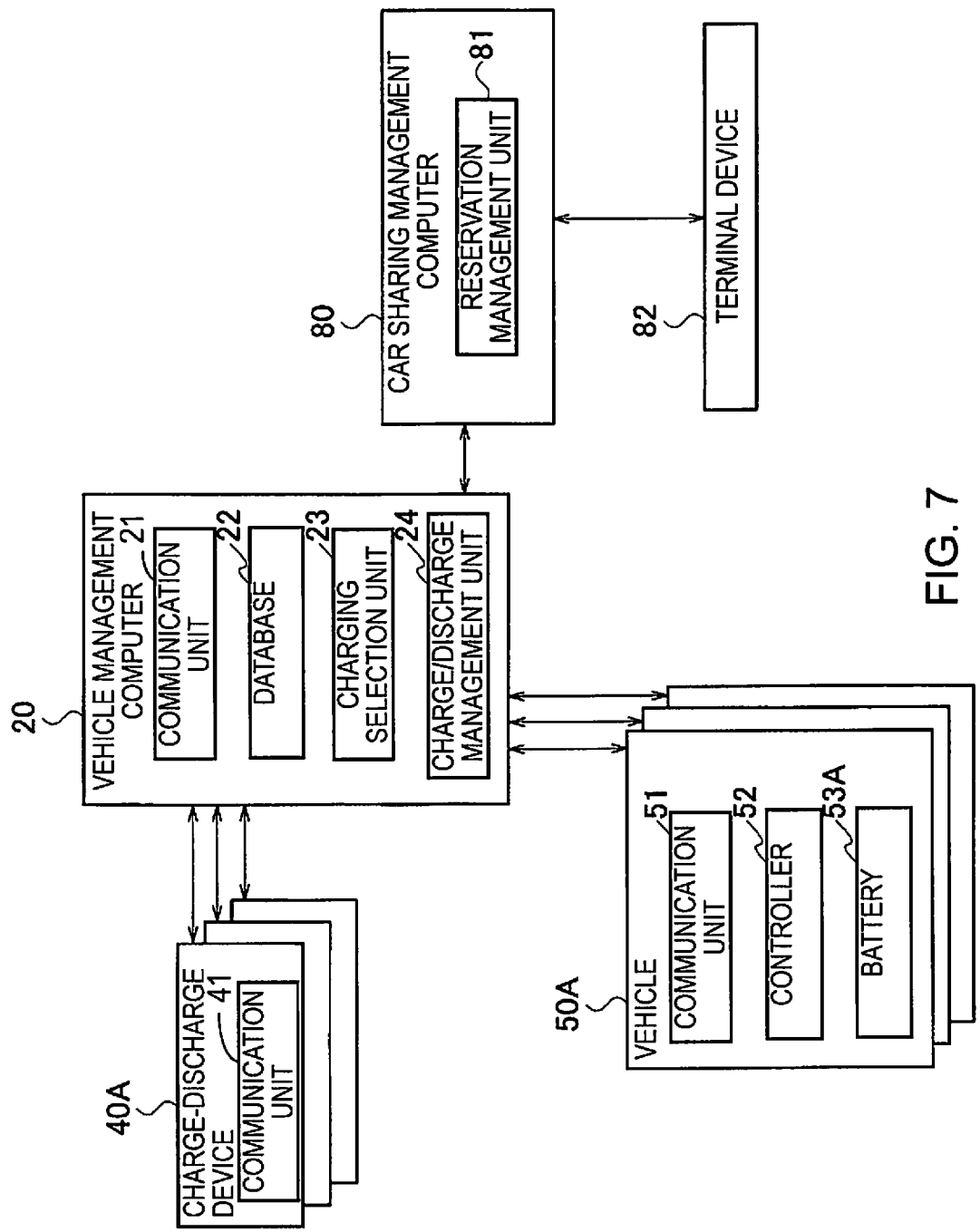
FIG. 7 is a schematic configuration diagram of the vehicle management system according to a second embodiment of the present invention.

Next, the second embodiment of the present invention will be described with reference to FIG. 7. As shown in FIG. 7, the vehicle management system 10 according to the second embodiment comprises a car sharing management computer 80 and a terminal device 82. The same reference numerals have been used for configurations that overlap with the first embodiment, and the descriptions thereof have been omitted. The differences are primarily described below. Car sharing is a system in which a plurality of vehicles (or one vehicle) is jointly used by a plurality of users. In the second embodiment, the vehicle 50A, the vehicle 50B, and the vehicle 50C shown in FIG. 5 are described as vehicles used in car sharing.

The car sharing management computer 80 is, for example, a general-purpose computer. The car sharing management computer 80 comprises a reservation management unit 81. The reservation management unit 81 manages user reservations. In addition, the car sharing management computer 80 communicates with the vehicle management computer 20 via the communication network 30. The terminal device 82 is a mobile terminal device (such as a smartphone) that is easy to carry, for example. A user that is able to use car sharing operates the terminal device 82 to make a reservation.

Figure 8:
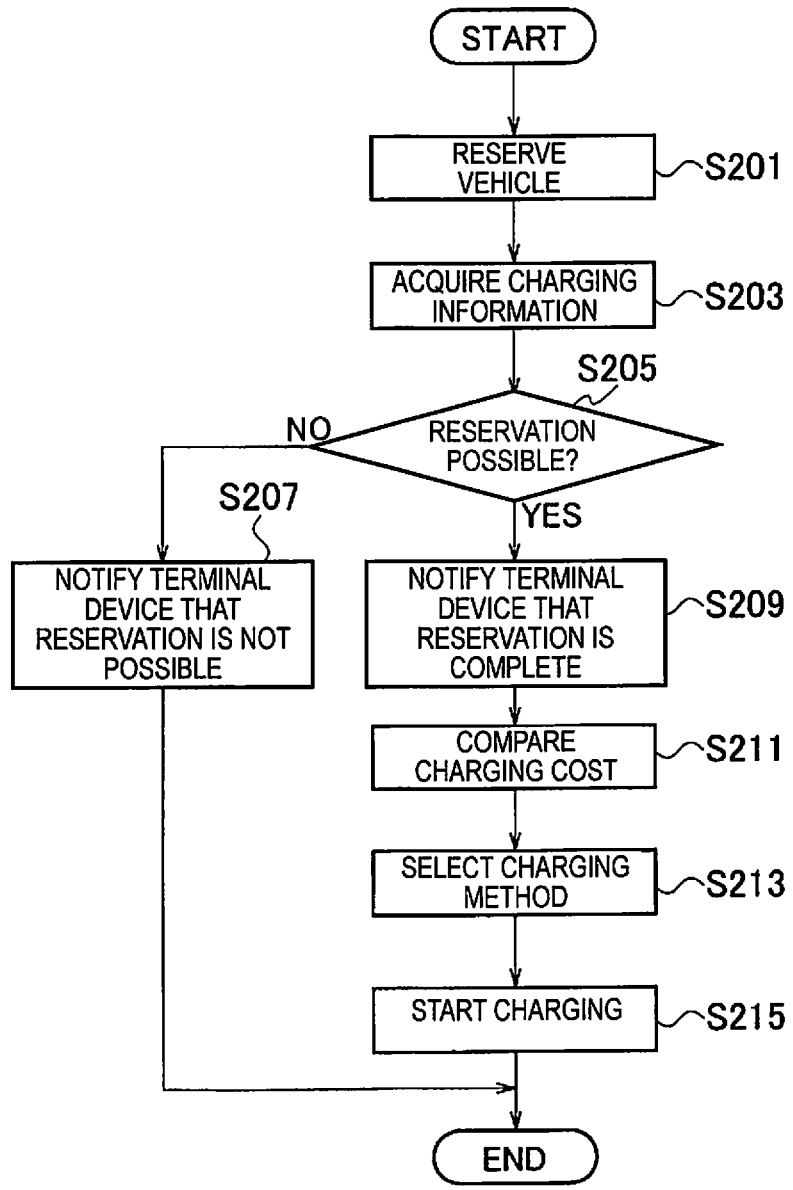
FIG. 8 is a flowchart describing one operation example of the vehicle management system according to the second embodiment of the present invention.

One operation example of the vehicle management system 10 according to the second embodiment will be described with reference to the flowchart shown in FIG. 8.

In Step S201, the user operates the terminal device 82 to reserve a desired vehicle. The vehicle reserved by the user is the vehicle 50A shown in FIG. 5. The car sharing management computer 80 sends the user's reservation information to the vehicle management computer 20. In the flowchart shown in FIG. 8, it is assumed that the user reserved vehicle 50A at 9:30 AM on Apr. 24, 2018, specifying the travel distance (200 km). At this time, the remaining capacity of the battery 53A of the vehicle 50A is 0 kWh. The travel distance specified by the user may be converted into a charging amount by the vehicle management computer 20. The converted charging amount is 30 kWh. It is assumed that the use time specified by the user is 10:00 AM to 2:00 PM, Apr. 24, 2018. The charge-discharge device 40A needs to charge the battery 53A in 30 minutes. In addition, the vehicles 50B, 50C shown in FIG. 5 are not reserved. Additionally, the car sharing according to the second embodiment is a system in which the charge is based on the use time, and the travel distance does not affect the charge. It is assumed that the car sharing fee in the second embodiment is ¥800/hour.

The process proceeds to Step S203 and the vehicle management computer 20 acquires various types of information relating to charging. The vehicle management computer 20 obtains information in regard to what could be used as a power source for charging the battery 53A. For example, the vehicle management computer 20 obtains information that the power grid 60, the battery 53B of the vehicle 50B, and the battery 53C of the vehicle 50C can be used as power sources for charging the battery 53A. In addition, as shown in FIG. 9, the vehicle management computer 20 acquires the remaining capacity of the battery 53B, the remaining capacity of the battery 53C, and the location information of the charge-discharge device 40A. In Case 1 of FIG. 9, the remaining capacity of the battery 53B is 30 kWh, and the remaining capacity of the battery 53C is 5 kWh. In Case 2 of FIG. 9, the remaining capacity of the battery 53B is 5 kWh, and the remaining capacity of the battery 53C is 5 kWh. In the flowchart shown in FIG. 8, it is assumed that the batteries 53B, 53C were charged to the full charging amount by means of nighttime grid power. In addition, the vehicle management computer 20 also acquires the remaining capacity of the battery 53A. As described above, the remaining capacity of the battery 53A is 0 kWh.

The process proceeds to Step S205, and the vehicle management computer 20 determines whether the vehicle 50A can be reserved. Here, a case in which the vehicle 50A cannot be reserved will be described. For example, when the charging amount specified by the driver is 30 kWh but the remaining capacities of the batteries 53B, 53C are both 5 kWh (refer to Case 2 in FIG. 9), the vehicle management computer 20 determines that the remaining capacities of the batteries 53B, 53C are insufficient. Then, the vehicle management computer 20 determines that the battery 53A cannot be charged using the electric power of the battery 53B or the battery 53C. In this case, the vehicle management computer 20 may carry out charging for the full 30 kWh using the electric power supplied from the power grid 60. If charging can be completed in time (within 30 minutes) using grid power, the vehicle management computer 20 determines that the vehicle 50A can be reserved. On the other hand, if charging cannot be completed in time (within 30 minutes) using grid power, the vehicle management computer 20 determines that the vehicle 50A cannot be reserved. In the case that the vehicle 50A cannot be reserved (No in Step S205), the process proceeds to Step S207, the car sharing management computer 80 notifies the terminal device 82 that a reservation cannot be made. On the other hand, as in Case 1 of FIG. 9, in the case that the remaining capacity of the battery 53B is 30 kWh, the vehicle management computer 20 determines that the battery 53A can be charged using the electric power of the battery 53B. In this case, the vehicle 50A can be reserved (Yes in Step S205). In Step S209, the car sharing management computer 80 notifies the terminal device 82 that the reservation of the vehicle 50A has been completed. In Case 1 of FIG. 9, the remaining capacity of the battery 53C is 5 kWh, so that the battery 53C cannot be used.

The process proceeds to Step S211, and the vehicle management computer 20 calculates the charging cost associated with charging the battery 53A using the grid power, and the charging cost associated with charging the battery 53A using the electric power of the battery 53B. In the following description, the term third cost is simply used in reference to those cases for which the charging cost is associated with charging the battery 53A by means of grid power. In addition, the term fourth cost is simply used in reference to those cases for which the charging cost is associated with charging the battery 53A by means of the electric power of the battery 53B. Since the current time is 9:30, the third cost is represented by Equation 3. The electricity charges are shown in FIG. 4, Table 2.

Equation 3

$$¥27/kWh \times 30 \ kWh = ¥810 \quad (3)$$

On the other hand, as described above, since the battery 53B was charged to the full charging amount by means of nighttime grid power, the fourth cost is represented by Equation 4.

Equation 4

$$¥13/kWh \times 30 \ kWh = ¥390 \quad (4)$$

The vehicle management computer 20 compares the third cost and the fourth cost and determines which charging means is less expensive. In this case, since the fourth cost is less than the third cost, the vehicle management computer 20 determines that charging the battery 53A using the electric power of the battery 53B is more economical.

The process proceeds to Step S213, and the vehicle management computer 20 selects an economical charging method. In the flowchart shown in FIG. 8, the vehicle management computer 20 selects the charging method that uses the electric power of the battery 53B.

The process proceeds to Step S215, and the vehicle management computer 20 sends the charging method selected in Step S213 to the charge-discharge device 40A. In other words, the vehicle management computer 20 sends a command to the charge-discharge device 40A to charge the battery 53A using electric power associated with the less expensive of the third cost and the fourth cost. The charge-discharge device 40A charges the battery 53A based on the command received from the vehicle management computer 20. In the flowchart shown in FIG. 8, the charge-discharge device 40A charges the battery 53A using the electric power of the battery 53B. It is thus possible to realize economical charging. In this manner, by means of the vehicle management system 10 according to the second embodiment, an economical charging can also be realized with respect to the battery of a vehicle used for car sharing. By means of the charging in Step S215, the remaining capacity of the battery 53B decreases. For this reason, the charge-discharge device 40B may wait until night to charge the battery 53B using nighttime grid power. In addition, if the electric power of the battery 53B of the vehicle 50B is used, it can also contribute to quick charging. This is also more convenient for the user.

In the Step S205 described above, if charging can be completed in time (within 30 minutes) using grid power, the vehicle management computer 20 determines that the vehicle 50A can be reserved. The revenue obtained by lending the vehicle 50A is represented by Equation 5. This revenue is the income earned by the car sharing company.

Equation 5

$$¥800 \times 4 \ hours = ¥3200 \quad (5)$$

The revenue obtained by lending the vehicle 50A is greater than the third cost (¥810). Thus, the vehicle management computer 20 may determine that the vehicle 50A can be reserved in accordance with the revenue earned from lending. In other words, the vehicle management computer 20 may determine that the vehicle 50A cannot be reserved even if charging can be completed using grid power in time (within 30 minutes). For example, if the user's use time were one hour instead of four hours, the revenue obtained by lending the vehicle 50A would be represented by Equation 6.

Equation 6

$$¥800 \times 1 \ hour = ¥800 \quad (6)$$

The revenue obtained by lending the vehicle 50A is less than the third cost (¥810). In this case, the net income for the car sharing company would be negative. Thus, the vehicle management computer 20 may determine that the vehicle 50A cannot be reserved.

Figure 10:
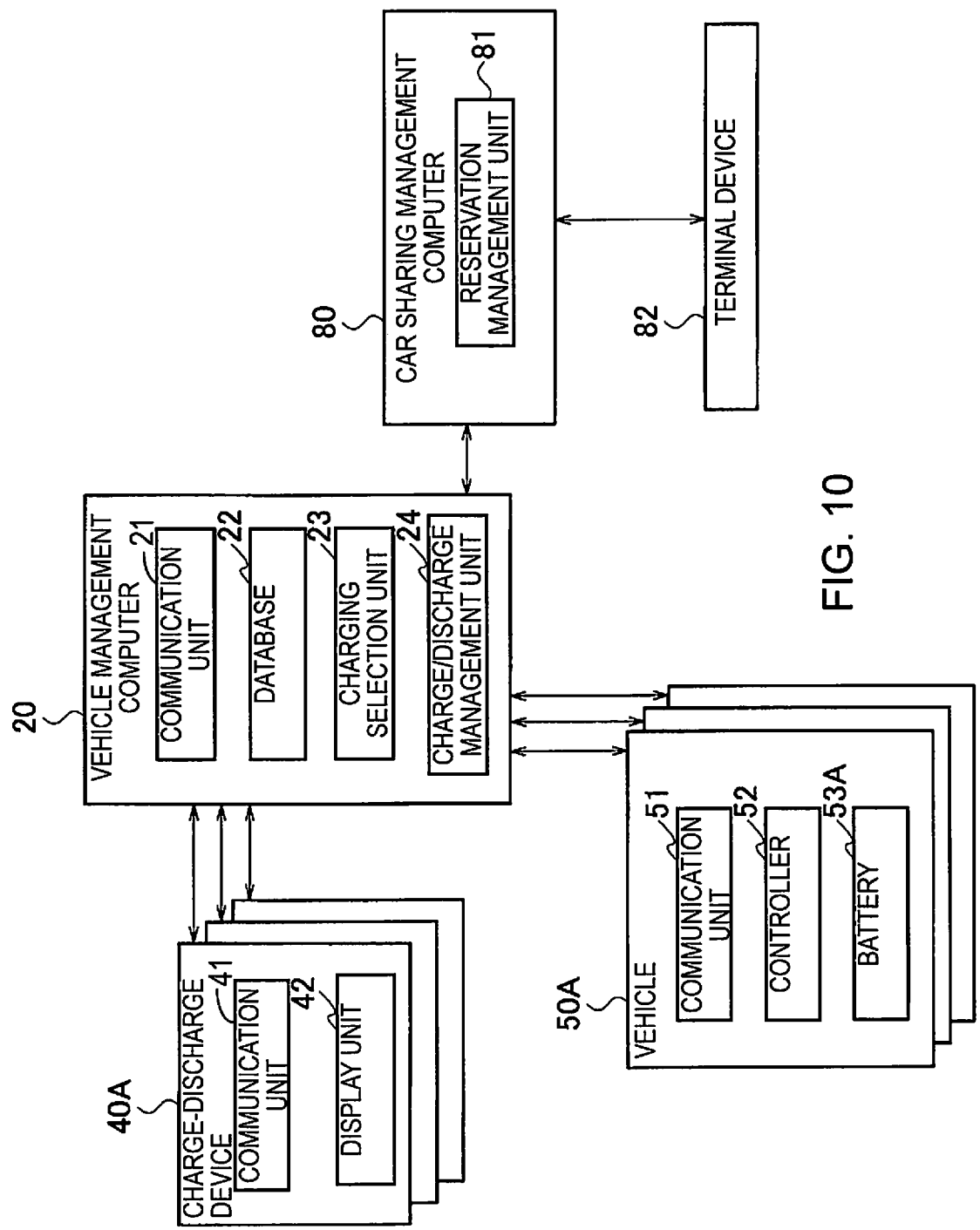
FIG. 10 is another schematic diagram of the vehicle management system according to the second embodiment of the present invention.

The vehicle management computer 20 may create a charge-discharge schedule relating to the time that the charge-discharge device 40A starts charging/discharging and the time required for the completion of the charging/discharging. The charge-discharge device 40A may display the cost and the charge-discharge schedule created by the vehicle management computer 20. For example, as shown in FIG. 10, the charge-discharge device 40A may display the charge-discharge schedule on a display unit 42. The user utilizing car sharing, the car sharing company, and the like, can check the charge-discharge schedule displayed on the display unit 42. In addition, since the charge-discharge device 40A charges the battery in accordance with the charge-discharge schedule, automatic charging and discharging can be realized. The display unit 42 is a liquid-crystal display, for example.

Third Embodiment

Figure 11:
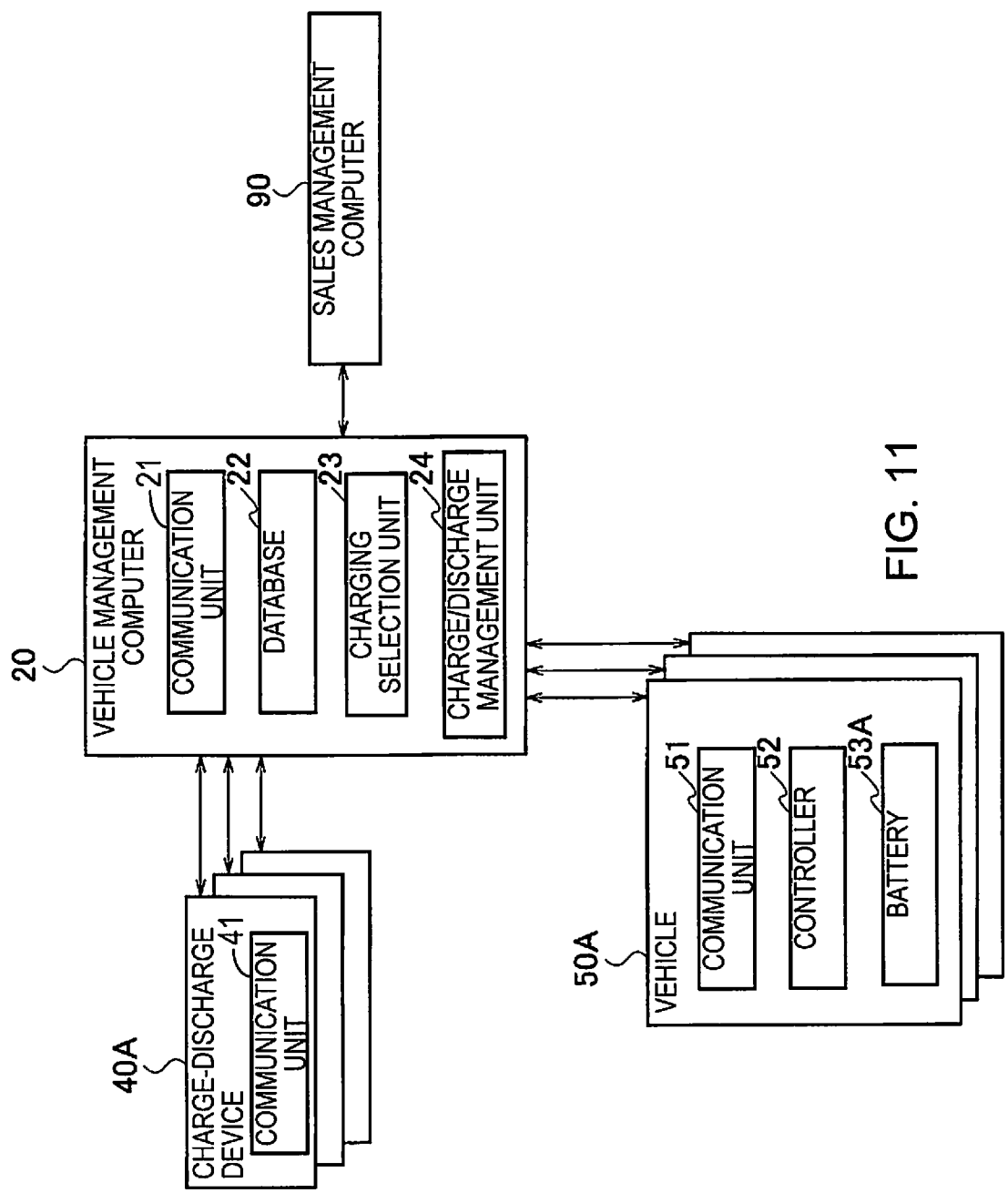
FIG. 11 is a schematic overview of the vehicle management system according to a third embodiment of the present invention.

The third embodiment will be described with reference to FIG. 11. As shown in FIG. 11, the vehicle management system 10 according to the third embodiment comprises a sales management computer 90. The same reference symbols have been cited for configurations that overlap with the first embodiment, and the descriptions thereof have been omitted. The differences are mainly described below.

The sales management computer 90 is, for example, a general-purpose computer. The sales management computer 90 stores customer information, delivery information relating to deliveries to customers, map database, and the like. The sales management computer 90 communicates with the vehicle management computer 20 via the communication network 30. In the third embodiment, the vehicle 50A, the vehicle 50B, and the vehicle 50C shown in FIG. 5 are described as vehicles used for delivery.

Figure 12:
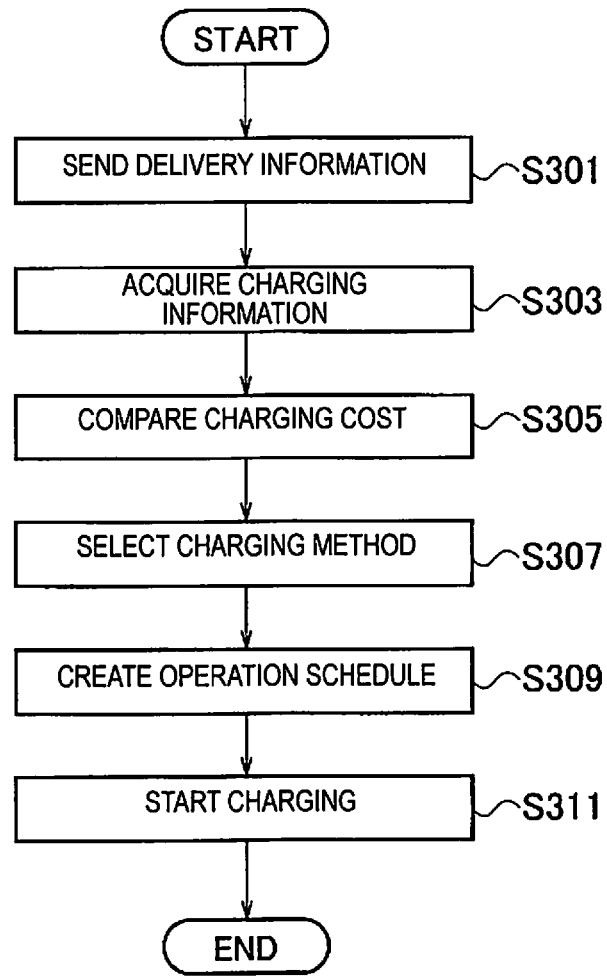
FIG. 12 is a flowchart describing one operation example of the vehicle management system according to the third embodiment of the present invention.

One operation example of the vehicle management system 10 according to the third embodiment will be described with reference to the flowchart shown in FIG. 12. However, Steps S305 and S307 shown in FIG. 12 are the same as Steps S107 and S109 shown in FIG. 3, so that the descriptions thereof will be omitted. In the flowchart shown in FIG. 12, the vehicle 50A is used for the present delivery.

In Step S301 shown in FIG. 12, the sales management computer 90 sends delivery information to the vehicle management computer 20. The process proceeds to Step S303 and the vehicle management computer 20 acquires various types of information relating to charging. The vehicle management computer 20 obtains information that the power grid 60, the battery 53B of the vehicle 50B, and the battery 53C of the vehicle 50C can be used as power sources for charging the battery 53A. In addition, the vehicle management computer 20 acquires the remaining capacity of the battery 53A, the remaining capacity of the battery 53B, the remaining capacity of the battery 53C, and the position information of the charge-discharge device 40A. The vehicle management computer 20 determines whether it is necessary to charge the battery 53A based on these acquired pieces of information. For example, the vehicle management computer 20 may determine whether it is necessary to charge the battery 53A based on the remaining capacity of the battery 53A and the delivery information. The vehicle management computer 20 can calculate the travel distance required for the delivery by referring to the delivery information. If the travel distance can be traveled with the remaining capacity of the battery 53A, it is not necessary to charge the battery 53A. On the other hand, if the travel distance cannot be traveled with the remaining capacity of the battery 53A, it is necessary to charge the battery 53A.

If it is necessary to charge the battery 53A, the process proceeds to Steps S305 and S307, and the vehicle management computer 20 selects an economical charging method. The process proceeds to Step S309 and the vehicle management computer 20 creates an operation schedule. An operation schedule is a schedule relating to which route to travel to make the delivery. That is, the vehicle management computer 20 optimizes the delivery route. The process proceeds to Step S311, and the vehicle management computer 20 sends the charging method selected in Step S307 and the operation schedule to the charge-discharge device 40A. The charge-discharge device 40A charges the battery 53A based on the command received from the vehicle management computer 20. The charge-discharge device 40A can thereby use the electric power associated with the less expensive of the first cost and the second cost to charge the battery 53A of the vehicle 50A. It is thereby possible to realize an economical charging. The charge-discharge device 40A may charge the battery 53A only by the amount required to travel the distance in accordance with the operation schedule. It is thereby possible to realize a more economical charging. In this manner, by means of the vehicle management system 10 according to the third embodiment, an economical charging can also be realized with respect to a battery of a vehicle used for delivery. In addition, if the electric power of the battery 53B of the vehicle 50B is used, it can also contribute to quick charging. As a result, the convenience of the delivery company can be improved.

Fourth Embodiment

Figure 13:
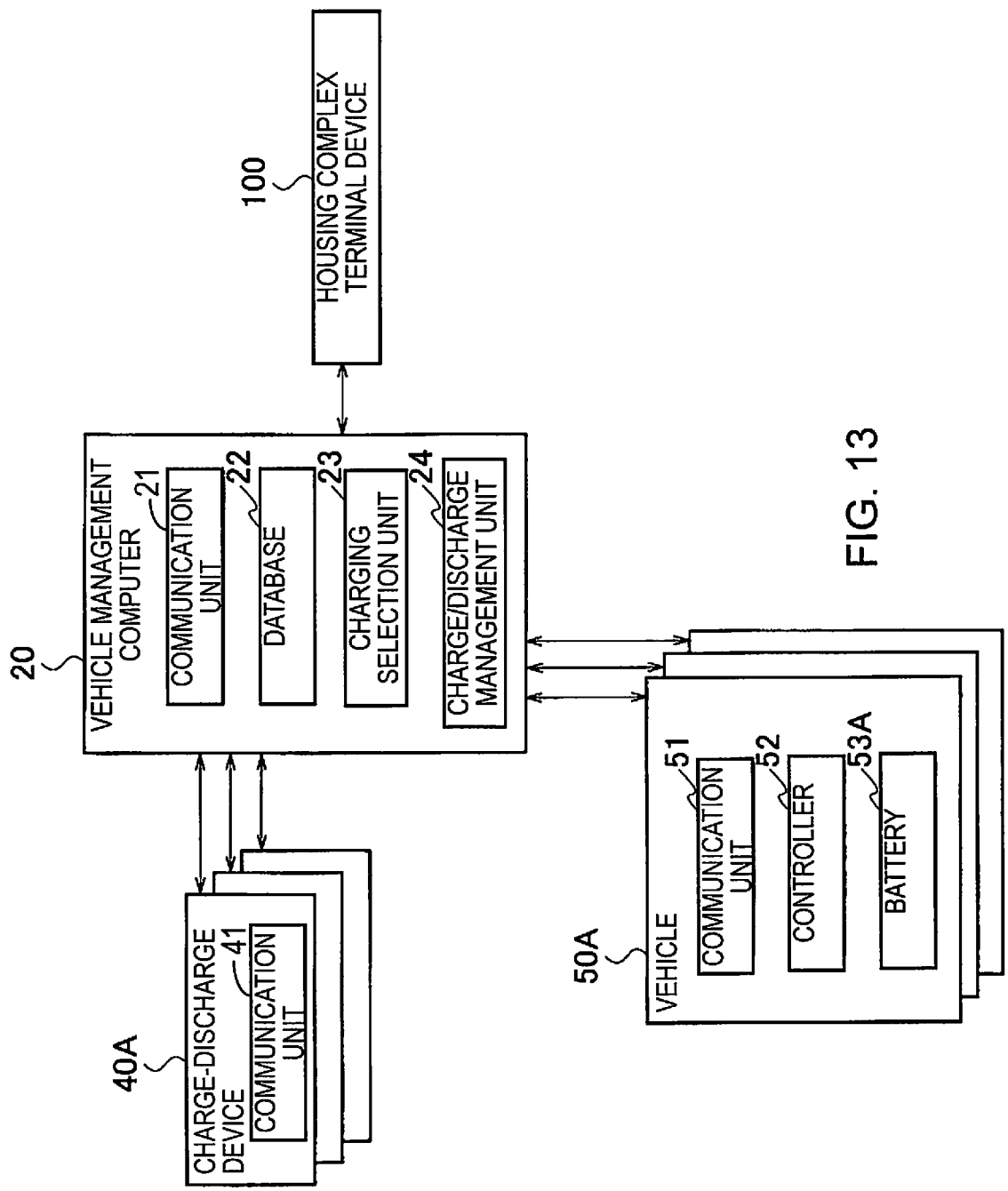
FIG. 13 is a schematic configuration diagram of the vehicle management system according to a fourth embodiment of the present invention.

Next, the fourth embodiment of the present invention will be described with reference to FIG. 13. As shown in FIG. 13, the vehicle management system 10 according to the fourth embodiment comprises a housing complex terminal device 100. The same reference symbols have been cited for configurations that overlap with the first embodiment, and the descriptions thereof have been omitted. The differences are mainly described below. In the fourth embodiment, the vehicle 50A, the vehicle 50B, and the vehicle 50C shown in FIG. 5 are described as vehicles used by the residents of a housing complex. In addition, in the fourth embodiment, the charge-discharge devices 40A-40C shown in FIG. 5 are installed in a parking lot of the housing complex. One charge-discharge device may be installed in the parking lot of the housing complex.

The housing complex terminal device 100 is a device used by the residents of the housing complex, and is a mobile terminal device (such as a smartphone) that is easy to carry, for example. The housing complex terminal device 100 communicates with the vehicle management computer 20 via the communication network 30. The housing complex terminal device 100 may be a device shared by the residents of the housing complex.

Figure 14:
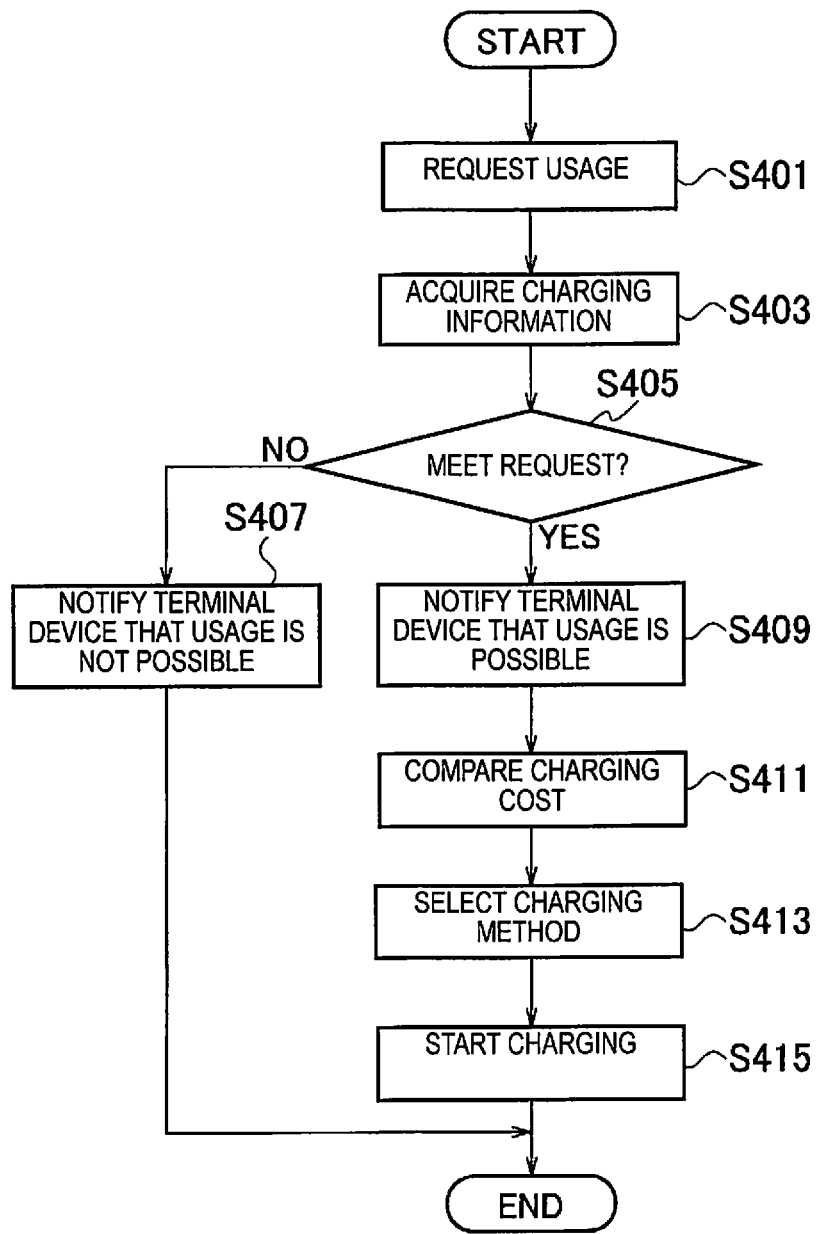
FIG. 14 is a flowchart describing one operation example of the vehicle management system according to the fourth embodiment of the present invention.

One operation example of the vehicle management system 10 according to the fourth embodiment will be described with reference to the flowchart shown in FIG. 14. However, Steps S411 and S413 shown in FIG. 14 are the same as Steps S107 and S109 shown in FIG. 3, so that the descriptions thereof will be omitted.

In Step S401, a resident of the housing complex operates the housing complex terminal device 100 to request usage of the vehicle 50A. Specifically, the resident specifies the date and time of use, the travel distance, and the like. The process proceeds to Step S403 and the vehicle management computer 20 acquires various types of information related to charging. The vehicle management computer 20 obtains information that the power grid 60, the battery 53B of the vehicle 50B, and the battery 53C of the vehicle 50C can be used as power sources for charging the battery 53A. In addition, the vehicle management computer 20 acquires the remaining capacity of the battery 53A, the remaining capacity of the battery 53B, the remaining capacity of the battery 53C, and the location information of the charge-discharge device 40A. The vehicle management computer 20 determines whether to meet the request of the resident based on these acquired pieces of information. For example, if the charging will not be completed by the time specified by the resident, the vehicle management computer 20 notifies the user (housing complex terminal device 100) that the request cannot be met (Step S407). On the other hand, if the charging will be completed by the time specified by the resident, the vehicle management computer 20 notifies the user (housing complex terminal device 100) that the request can be met (Step S409).

In Step S415, the vehicle management computer 20 sends the charging method selected in Step S413 to the charge-discharge device 40A. The charge-discharge device 40A charges the battery 53A based on the command received from the vehicle management computer 20. The charge-discharge device 40A can thus use the electric power associated with the less expensive of the first cost and the second cost to charge the battery 53A of the vehicle 50A. It is thus possible to realize economical charging. In this manner, by means of the vehicle management system 10 according to the fourth embodiment, economical charging can also be realized for the battery of a vehicle used in a housing complex. In addition, if the electric power of the battery 53B of the vehicle 50B is used, it can also contribute to quick charging. This is also convenient for the residents of the housing complex.

Each of the functions described in the embodiments above may be implemented by means of one or more processing circuits. The processing circuits include a programmed processing device, such as a processing device including an electronic circuit, and the like. In addition, the processing circuits include devices such as circuit components and application specific integrated circuits (ASIC) arranged to execute the described functions. Additionally, the vehicle management system 10 may improve the function of the computer.

The embodiments of the present invention have been described as above, but the descriptions and figures constituting a part of this disclosure should not be understood as limiting the present invention. Various alternative embodiments, examples, and operational technologies should be apparent to a person skilled in the art from this disclosure.

For example, the vehicle management computer 20 may also create a charge-discharge schedule in the first, third, and fourth embodiments. In addition, the charge-discharge device 40A may also be provided with the display unit 42 that displays the charge-discharge schedule in the first, third, and fourth embodiments.

Figure 15:
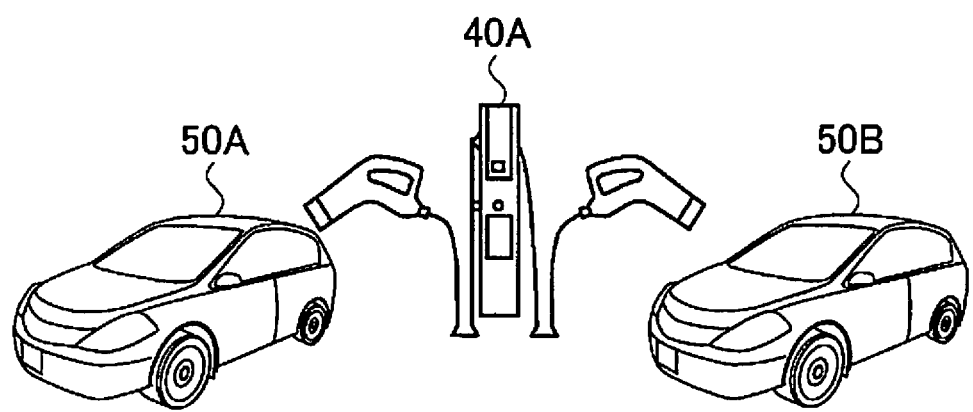
FIG. 15 is a diagram describing one example of a charge-discharge device according to the present invention.

In FIG. 1, the charge-discharge device 40A is connected to one vehicle 50A, but no limitation is imposed thereby. As shown in FIG. 15, the charge-discharge device 40A may be connected to a plurality of vehicles (vehicles 50A, 50B).

Further, the present invention can be applied off-grid. Off-grid means unconnected to the power grid 60. In regard to the off-grid state, the vehicle management system 10 may compare the case for which charging is carried out using the electric power discharged from the battery of another vehicle and the case for which charging is carried out using the power from a photovoltaic cell or a domestic storage battery, and use the electric power associated with the less expensive of the two.

The invention claimed is:

1. A vehicle management system comprising:
a plurality of vehicles each being provided with a battery, the plurality of vehicles including a first vehicle and a second vehicle;
a charge-discharge device that charges and discharges the batteries; and
a vehicle management computer that manages the plurality of vehicles and the charge-discharge device,
the vehicle management computer being configured to:
acquire information, when a reservation for the first vehicle is received that includes at least a use time from a user's terminal device that is related to a charging facility that supplies electric power to the charge-discharge device, and information that is related to the battery of the second vehicle that is different from the first vehicle and which is not reserved by a user, and which battery is connected to the first vehicle via the charge-discharge device, to determine whether a vehicle reservation received from the user is possible,
determine which is less expensive, a first cost associated with charging the battery of the first vehicle using electric power supplied from the charging facility, or a second cost associated with charging the battery of the first vehicle using electric power that is discharged from the battery of the second vehicle, based on the information relating to the charging facility and the information relating to the battery of the second vehicle, and
send a command to the charge-discharge device to charge the battery of the first vehicle using the electric power associated with the less expensive of the first cost and the second cost,
the second cost being determined based on a cost of charging the battery of the second vehicle at a previous time;
the charge-discharge device configured to:
charge the battery of the first vehicle with the charge-discharge device based on the command received from the vehicle management computer.

2. The vehicle management system according to claim 1, wherein
the vehicle management computer is configured to calculate a required charging amount based on the vehicle reservation received from the user, determines whether the required charging can be completed by means of electric power of either the charging facility or the battery of the second vehicle, and notifies the user whether a reservation is possible.

3. The vehicle management system according to claim 2, wherein
the vehicle management computer notifies the user that a reservation is not possible upon determining that the required charging cannot be completed by electric power from either the charging facility or the battery of the second vehicle.

4. The vehicle management system according to claim 2, wherein
the vehicle management computer notifies the user that reservation is not possible upon determining that revenue obtained from the vehicle reservation received from the user is less than the first cost.

5. The vehicle management system according to claim 1, wherein
the information relating to the charging facility includes the base rate, the daytime rate, and the nighttime rate related to a power grid contract.

6. The vehicle management system according to claim 1, wherein
the information related to the charging facility includes electricity charges for each region.

7. The vehicle management computer according to claim 1, further comprising:
a sales management computer for managing delivery information related to delivery to customers,
the first vehicle and the second vehicle are delivery vehicles,
the sales management computer sends the delivery information to the vehicle management computer, and
the vehicle management computer sends a command to the charge-discharge device to charge the battery of the first vehicle using the electric power related to the less expensive of the first cost and the second cost upon determining that it is necessary to charge the battery of the first vehicle based on the delivery information received from the sales management computer.

8. The vehicle management method according to claim 1, wherein the first vehicle and the second vehicle are used by the residents of a housing complex, and
the vehicle management computer sends a command to the charge-discharge device to charge the battery of the first vehicle using the electric power having either the first cost or the second cost that is less expensive upon determining the battery of the first vehicle used by the residents needs to be charged.

9. The vehicle management system according to claim 1, wherein the vehicle management computer creates a charge-discharge schedule related to a time that the charge-discharge device initiates charging/discharging and a time required until a completion of the charging/discharging,
the charge-discharge device comprises a display that displays the charge-discharge schedule, and
the charge-discharge device initiates the charging/discharging based on the charge-discharge schedule received from the vehicle management computer.

10. A vehicle management computer that manages a plurality of vehicles each being provided with a battery, and a charge-discharge device for charging and discharging the batteries, the plurality of vehicles including a first vehicle and a second vehicle, the vehicle management computer comprising:
a processor programmed to:
acquire information relating to a charging facility that supplies electric power to the charge-discharge device when a reservation for the first vehicle is received that includes at least a use time from a user's terminal device, and acquire information relating to the battery of the second vehicle, which is different from the first vehicle and which is not reserved by the user, and which is connected to the first vehicle via the charge-discharge device, to determine whether the vehicle reservation received from the user is possible,
determine which is less expensive, a first cost associated with charging the battery of the first vehicle using electric power supplied from the charging facility, or a second cost associated with charging the battery of the first vehicle using electric power that is discharged from the battery of the second vehicle, based on the information relating to the charging facility and the information relating to the battery of the second vehicle, and
send a command to the charge-discharge device to charge the battery of the first vehicle using the electric power related to the less expensive of the first cost and the second cost,
the second cost being determined based on a cost of charging the battery of the second vehicle at a previous time.

11. A vehicle management method for managing a plurality of vehicles each being provided with a battery, and a charge-discharge device for charging and discharging the batteries, the plurality of vehicles including a first vehicle and a second vehicle, the vehicle management method comprising:
acquiring, by a vehicle management computer, information, when a reservation for the first vehicle is received that includes at least a use time from a user's terminal device, which is related to a charging facility that supplies electric power to the charge-discharge device, and information which is related to the battery of the second vehicle, which is different from the first vehicle and which is not reserved by the user, and which battery is connected to the first vehicle via the charge-discharge device, to determine whether the vehicle reservation received from the user is possible,
determining, by the vehicle management computer, which is less expensive, a first cost associated with charging the battery of the first vehicle using electric power supplied from the charging facility, or a second cost associated with charging the battery of the first vehicle using electric power that is discharged from the battery of the second vehicle, based on the information relating to the charging facility and the information relating to the battery of the second vehicle,
sending, by the vehicle management computer, a command to the charge-discharge device to charge the battery of the first vehicle using the electric power associated with the less expensive of the first cost and the second cost, the second cost being determined based on a cost of charging the battery of the second vehicle at a previous time, and
charging, by the charge-discharge device, the battery of the first vehicle using the electric power related to the less expensive of the first cost and the second cost.

\* \* \* \* \*